United States Patent [19]
Tezuka

[11] 3,802,527
[45] Apr. 9, 1974

[54] PASSENGER SAFETY DEVICE FOR VEHICLES
[75] Inventor: Nobuyasu Tezuka, Sagamihara, Japan
[73] Assignee: Central Jidosha Kabushiki Kaisha, Tokyo-to, Japan
[22] Filed: Apr. 24, 1972
[21] Appl. No.: 246,813

[30] Foreign Application Priority Data
Apr. 28, 1971 Japan.............................. 46-27520

[52] U.S. Cl. ........................... 180/82, 280/150 B
[51] Int. Cl. .......................................... B60r 21/02
[58] Field of Search ..... 280/150 B, 150 AB; 180/82

[56] References Cited
UNITED STATES PATENTS
3,279,817  10/1966  Henry............................ 280/150 B
3,614,129  10/1971  Sobkow........................ 280/150 AB FOREIGN PATENTS OR APPLICATIONS
264,159   12/1964  Australia...................... 280/150 B
1,003,534  9/1965  Great Britain ................ 280/150 B Primary Examiner—Robert R. Song
Attorney, Agent, or Firm—E. F. Wenderoth et al.

[57] ABSTRACT

A base frame fixed to a part of a vehicle supports a well padded buffer board with a rearward downward inclination of approximately 45 degrees such that a padded concave rear surface thereof is directed toward and stationed near the front pelvic region of a seated passenger facing the vehicle front direction. The buffer structure operates at the time of a collision of the vehicle to hold, at its rear concave surface, the passenger's pelvic region and absorb most of his inertia energy and, further, to arrest and absorb, at its upper inclined surface, any forward slamming movement of the passenger's head and upper body.

2 Claims, 8 Drawing Figures

3,802,527

PASSENGER SAFETY DEVICE FOR VEHICLES

BACKGROUND OF THE INVENTION

This invention relates generally to safety devices in automobiles and other vehicles for protecting passengers thereof against injury in the event of a collision.

More particularly, the invention relates to a new and advanced passenger safety device for a vehicle of relatively simple construction and operation affording convenience in normal use and highly reliable and effective protection in the event of a collision.

Among the safety devices of this character known heretofore, there has been one type comprising a balloon or bag mounted on the vehicle body forward of each seat and operating in response to a collision involving the vehicle to inflate abruptly with a gas and arrest the forward movement of the upper body of a passenger seated in that seat, thereby cushioning and absorbing impact which would otherwise be applied to the passenger.

This type of safety device, however, not only lacks reliability on the point of positive inflation of the bag always without fail within a specified time but also entails the undesirable possibility of the passenger slipping under the bag because of reasons due to the position of the seated passenger's center of gravity. In order to prevent this, it is disadvantageously necessary to install another similar bag forward of the knees of the seated passenger. Furthermore, in the event of an overturning of the vehicle or a side collision, the gas bag or bags cannot restrain or hold the passenger's body, whereby it is difficult to assure all-round safety.

Another widely used protective device comprises a lap belt for holding the pelvic region of passenger to the seat and a shoulder belt for holding the passenger's upper body to the seat back. These two belts are intended to be used in combination, but since the passenger then cannot move his body freely, the shoulder belt is not used in many cases, whereby its effectiveness is not utilized.

SUMMARY OF THE INVENTION

It is an object of this invention to overcome the inadequacies of the prior passenger safety devices by providing a new and advanced safety device based on a completely original concept.

According to this invention, briefly summarized, there is provided a safety device for vehicles comprising a body-holding buffer structure made up of a frame structure and a shock-absorbing padding covering the frame structure, the buffer structure having a rear concave surface and an upper surface, and a base frame mounted on a part of the vehicle and supporting the buffer structure with an orientation such that the concave surface is directed rearward toward and disposed near the pelvic region a seated passenger facing the forward traveling direction of the vehicle, the buffer structure operating at the time of a collision of the vehicle to hold, at its concave surface, the passenger's pelvic region and absorb some of the passenger's inertia energy and to arrest and absorb, at its upper surface, any forward slamming movement of the passenger's head and upper body.

The nature, principle, and utility of this invention will be more clearly apparent from the following detailed description with respect to preferred embodiments of the invention when read in conjunction with the accompanying drawings, in which like or equivalent parts are designated by like reference numerals.

DETAILED DESCRIPTION

Figure 1:
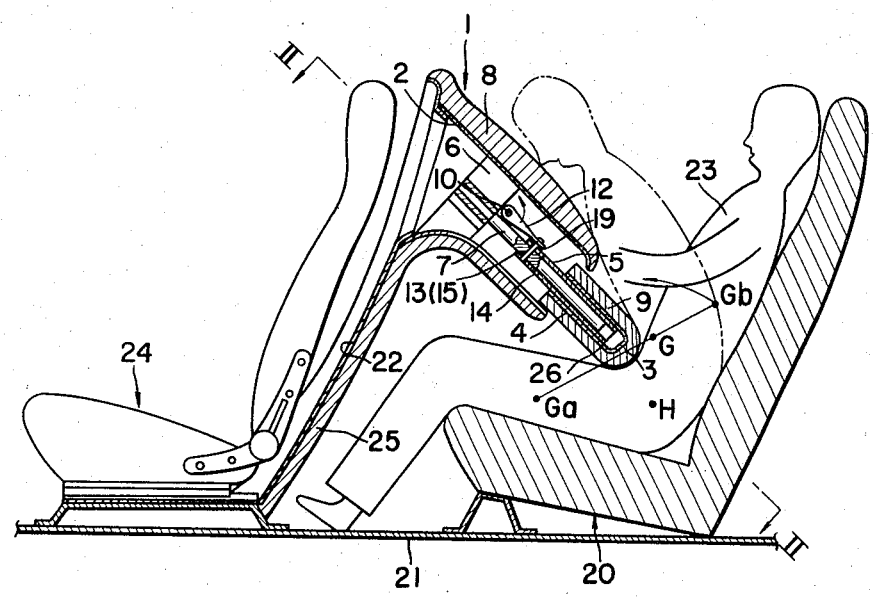
FIG. 1 is a side elevation, with parts in vertical section taken along the discontinuous planes indicated by line I — I in FIG. 2 as viewed in the arrow direction, showing one example of a safety device embodying the invention.
Figure 2:
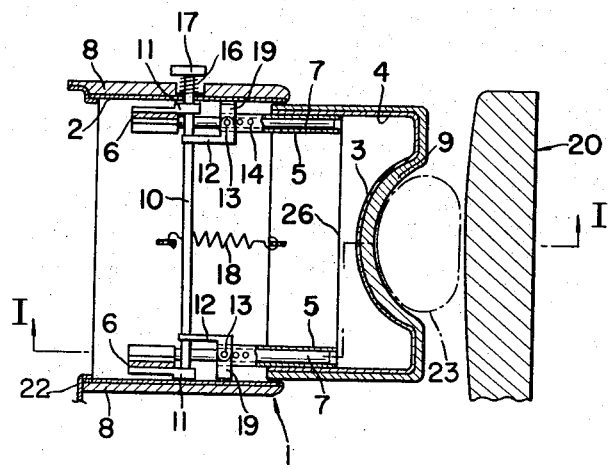
FIG. 2 is a section taken along the plane indicated by line II—II in FIG. 1 as viewed in the indicated arrow direction.

In a first example of this invention as illustrated in FIGS. 1 and 2, the principal part thereof is a body-holding buffer structure (hereinafter referred to as a holding board) generally designated by the reference numeral 1.

The holding board 1 in this example is of telescopic construction whereby it can elongate and contract and comprises essentially a fixed frame structure 2 having the shape of a tube of rectangular cross section with a large lateral width and a movable frame structure 4 also having the shape of a tube of rectangular cross section with a large lateral width and freely fitted in the frame structure 2, the outer or rear end of this structure 4 being closed by a holding plate 3 with an arcuate concavity (in plan view) corresponding to and adapted to fit against the pelvic region of a seated human body.

Round tubes 5, 5 are fixed to the two lateral sides of the frame structure 4 on the inner surface thereof with orientation substantially parallel to the longitudinal direction of the frame structures perpendicular to their lateral direction. Rods 7, 7 are slidably fitted at their outer or rear ends in respective round tubes 5, 5 and are fixed at their inner or front ends to respective mounting brackets 6, 6, which in turn are fixed to and supported by the inner root or proximal part of the fixed frame structure 2. The movable frame structure 4 is thereby free to move into and out of the interior of the fixed frame structure 2. The outer surfaces of the both frame structures 2 and 4 are covered with shock-absorbing materials 8 and 9 such as an urethan foam.

A transverse shaft 10 for board length adjustment is rotatably supported by bearings 11, 11 respectively fixed to and supported by the mounting brackets 6, 6. The transverse shaft 10 supports levers 12, 12 fixed thereto at positions to confront respective rods 7, 7. Each of the levers 12, 12 is provided near its distal end with a pin 13 loosely fitted therethrough and adapted to be selectively fitted into any of a plurality of pin holes 14 formed in the corresponding round tube 5 at spaced-apart positions along the axis of the corresponding rod 7 and into a pin hole 15 formed in the rod 7, whereby the degree of insertion of the movable frame structure 4 in the fixed frame structure 2, i.e., the fore-and-aft length of the holding board 1,can be selected, and, simultaneously, the two frame structures 4 and 2 can be locked to each other.

The extraction and insertion of the pins 13, 13 into and out of the pin holes 14 and 15 to accomplish this selective adjustment and locking is effected by the turning of the transverse shaft 10 about its own axis to raise and lower the distal ends of the levers 12, 12. The transverse shaft 10 can be thus turned from the outsise by means of a handle or grip 17 fixed to one end of the transverse shaft and disposed in a position accessible from outside of the holding board. Furthermore, the transverse shaft 10 is urged by a coil spring 16 to rotate in the direction (clockwise as viewed in FIG. 1) which causes the pins 13 to be inserted into and held in the pin holes 14 and 15, whereby positive locking is assured once an adjustment has been made.

A tension spring 18 is stretched between the frame structures 2 and 4 to apply a force continually urging the structure 4 to retract into the structure 2. Accordingly, when the grip 17 is turned to extract the pins 13 from their pin holes 14 and 15, the frame structure 4 is drawn into the fixed frame structure 2, whereby the length of holding board 1 is shortened.

Pin guide brackets 19, 19 are fixed to the inner surfaces of opposite side walls of the fixed frame structure 2 and function to guide respective pins 13 accurately into the pin holes 14 and 15 without side sway.

The proximal or root end of the fixed frame structure 2 is fixedly mounted and supported on the upper end of a base frame 22 fixed to the floor board 21 of a vehicle so as to form an integral structure with a seat 20. The fixed frame structure is thus mounted with an orientation such that the holding board is inclined and rearwardly directed toward the pelvic region of a person 23 sitting on the seat 20. During use of the instant safety device, a small gap is left between the concave surface of the rear end of the holding board 1 and seated person 23.

The above mentioned base frame 22 is shaped to follow the rear surface of a front seat 24. A shock-absorbing material 25 is bonded onto the rear surface of the base frame 22.

Near the rear end of the movable frame structure 4 of the holding board 1 and in the bottom plate thereof across the entire width, there is provided a slit or score line 26 for facilitating the crumpling of the rear end of the frame structure by the inertia of the seated person 23 of the time of a collision.

The safety device of the above described organization according to this invention operates in the following manner. When, with the person 23 in the seated state as shown by full line in FIG. 1, the vehicle collides with another object, the pelvic region of the person 23 is held by the rear end of the holding board 1, but the upper body is caused by the inertia force acting at the center of gravity $G_b$ of the upper body to bend over in a rotating motion about a point H (approximately the hip joint between the upper and lower bodies) as indicated by the arrow and to assume the state indicated by chain line, striking the shock-absorbing material 8, by which the impact is absorbed.

While the center of gravity $G_a$ of the lower body is positioned below the holding board 1, there is no possibility of the seated person being caused by his inertia to slide into the space below the holding board 1 because the center of gravity G of the entire body of the person 23 is positioned above the rear end of the holding board 1.

Figure 6:
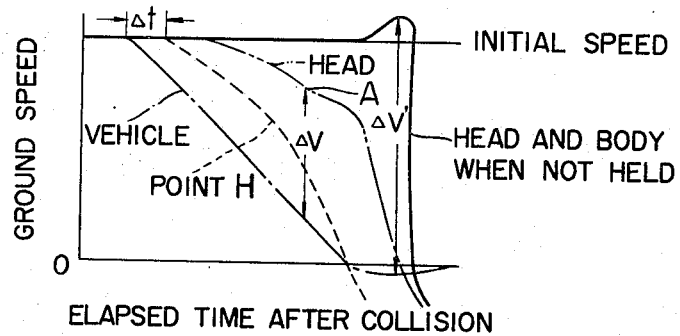
FIGS. 6 and 7 are graphical representations respectively indicating the deceleration performances of safety devices according to the invention.

Consequently, the vehicle and parts of the body of the passenger undergo respective decelerations as indicated in FIG. 6. The vehicle decelerates most rapidly in the manner indicated by the single-dot chain line, which is substantially linear, whereas point H of the passenger's body decelerates, as shown by the intermittent line, with a cushioning effect of the shock-absorbing material 9. The head of the passenger decelerates also as indicated by the two-dot chain line until the head strikes the shock-absorbing material 8 on the upper face of the holding board 1 as indicated by point A, from which the cushioning effect of the material 8 is apparent until zero velocity is reached.

In the case where a collision occurs under the same conditions except that the holding board 1 is not present, the head and the body of the passenger undergo a secondary collision with an object in front, such as the seat in front, with a velocity difference of $\Delta V'$ as indicated by the solid line in FIG. 6. In contrast, when the safety device of the above described example of this invention is used, decelerations of the point H and the head progress, and then the head contacts the shock-absorbing material 8 as a secondary collision.

In order to reduce the impact of this secondary collision, it is desirable that the difference $\Delta V$ between the velocities of the passenger's head and the vehicle be made as small as possible. For this purpose, the provision of a small distance between the shock-absorbing material 8 and the passenger's head in its original position before collision is effective. Accordingly, the holding board 1 should be mounted with an inclination of the order of 45 degrees relative to the horizontal plane.

This arrangement of the holding board 1 is effective and convenient in that the passenger, upon sensing the imminence of a collision, will instinctively extend his arms as props or throw his arms up as a guard against the holding board 1 thereby to prevent of cushion the secondary collision of the head against the shock-absorbing material 8. Furthermore, in order to reduce the differences between the velocities of the vehicle and the point H and between the velocities of the vehicle and the head, the gap between the rear end of the holding board and the pelvic region of the seated passenger should be made as small as possible to reduce the time interval $\Delta t$ indicated in FIG. 6.

Figure 7:
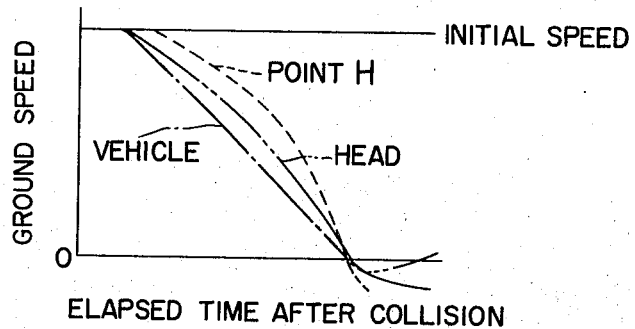

While the foregoing description relates to the case where the passenger is initially seated on the seat 20 with his back resting against the seat back, he may be bent forward with his upper body in contact with the holding board 1 as indicated by the chain line in FIG. 1. In such a case the deceleration state in the event of a collision will be as indicated in FIG. 7, which obviously produces maximum effectiveness in affording safety and functional reliability. This feature of the invention is highly advantageous and convenient in that maximum safety is afforded when the passenger is unable to prepare for or take protective measures against a collision as, for example, in the case where he is leaning forward on the holding board and napping.

The reason for directing the rear end of the holding board toward the pelvic region of the seated passenger is that the pelvic region is the strongest in the human body with respect to the impact load occurring in the instant situation, and the risk of damage to the internal organs is a minimum when the principal impact load is applied to the pelvic region.

It will be apparent that only the basic and essential structure of the safety device according to this invention has been described above and that many refinements and improvements can be made therein. For example, increased safety can be afforded by fixing to the fixed frame structure 2 a projecting handle or hand rail which the seated passenger can grab and hold on to in the event of a collision.

Furthermore, by the use of the above described example of safety device, the handle 17 of the holding board 1 must be manipulated each time the passenger takes his seat and each time he rises. Moreover, when the gap between the rear end of the holding board and the passenger's pelvic region is made small as recommended hereinabove, the holding board restricts twisting of the passenger's upper body to face sideways.

Figure 3:
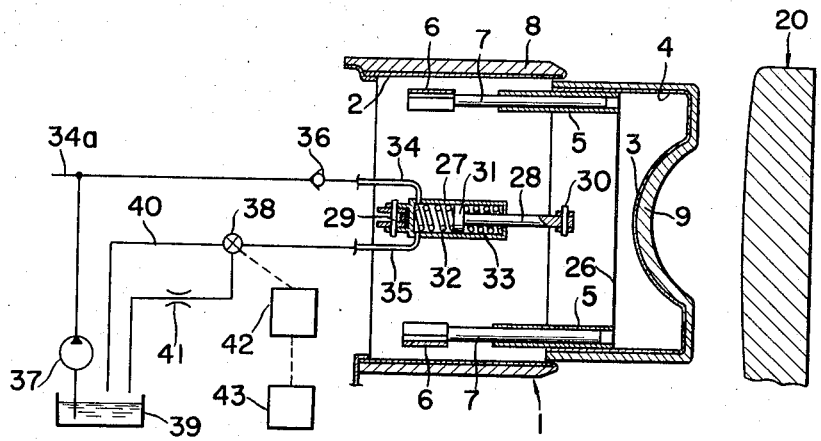
FIG. 3 is a section corresponding to FIG. 2 and showing another example of a safety device according to the invention.

This invention contemplates solving these problems by providing a safety device as illustrated by one example in FIG. 3. In this device, most of the parts of the holding board 1 are identical to those of the example shown in FIGS. 1 and 2, and such like parts are designated respectively by the same reference numerals as in FIGS. 1 and 2. The instant example shown in FIG. 3 differs from the preceding example in that the transverse shaft and related parts are omitted. Instead, in the root or base parts of the frame structures 2 and 4, respectively, the outer ends of a cylinder 27 and a piston rod 28 of a hydraulic cylinder device are pivotally secured as at 29 and 30.

The piston rod 28 is connected to a piston 31 slidably disposed in the cylinder 27, and compression springs 32 and 33 are accommodated in chambers of the cylinder 27 on respective sides of the piston 31. A pipe 34 is communicatively connected to the cylinder chamber on its head end, i.e., the chamber accommodating the spring 32, and the delivery outlet of a hydraulic pump 37 is connected by way of a check valve to this pipe 34. Another pipe 35 is also connected to the same head chamber of the cylinder 27 and is connected by way of one outlet of a two-way switching valve 38 to a return pipe 40 to a hydraulic fluid reservoir 39. The other outlet of the two-way valve 38 is connected by way of an orifice 41 to the same reservoir 39.

The two-way valve 38 is actuated by an automatic switching device 42 operating in response to a signal from a sensor 43 adapted to sense deceleration due to collision of the vehicle. Normally, the two-way valve is in a first position whereby the pipe 35 and the pipe 40 are communicative. When the vehicle collides with another object, the sensor 43 senses the resulting deceleration and operates the switching device to actuate the valve 38 instantaneously, whereby the pipe 35 is communicated with the orifice 41.

The delivery side of the hydraulic pump 37 can be connected, as indicated by a branch line 34a, to the holding board of another seat.

By the above described structural organization of the safety device, the normal operation of the hydraulic system comprises merely a flow of the hydraulic fluid delivered from the hydraulic pump 37 through the head chamber of the cylinder 27 to return to the hydraulic fluid reservoir 39. Accordingly, the elongation and contraction action of the holding board 1, that is, the relative movement of the movable frame structure 4 in and out of the fixed frame structure 2, is affected merely by the resistance of the elastic forces of the springs 32 and 33 in the cylinder 27 and the force of gravity on the frame structure 4, whereby the holding board may be said to be freely elongating and contracting.

Accordingly, when the passenger takes or leaves his seat, he can readily move the frame structure 4 by hand. When he is seated, the rear end of the holding board is continually in light contact with the front of his pelvic region because of the elastic forces of the springs 32 and 33 and the weight of the frame structure 4, and yet his body can move freely.

When the vehicle collides, however, the inertia of the seated passenger exerts a force tending to ram the piston rod 28 further into the cylinder 27. At the same time, the sensor 43 and the automatic switching device 42 operate to switch the outlet of the valve 38 to the pipe line of the orifice 41. Consequently, and since the check valve 36 prevents reverse flow in the pipe 34, the hydraulic fluid thus pressurized in the cylinder 27 is discharged gradually through the orifice 41, whereby the inertia energy of the passenger's body is absorbed, and the body is gradually decelerated.

An alternative arrangement which is employable is that wherein the orifice is not provided, and the hydraulic fluid within the cylinder 27 is prevented completely from being discharge at the time of a collision, in which case the shock-absorbing capacity of the device is similar to that of the example described before with reference to FIGS. 1 and 2. In a further alternative arrangement, the hydraulic pump 37 is omitted, and the pipes 34 and 40 and the orifice 41 are connected to a reserve tank to form a closed hydraulic circuit.

Figure 4:
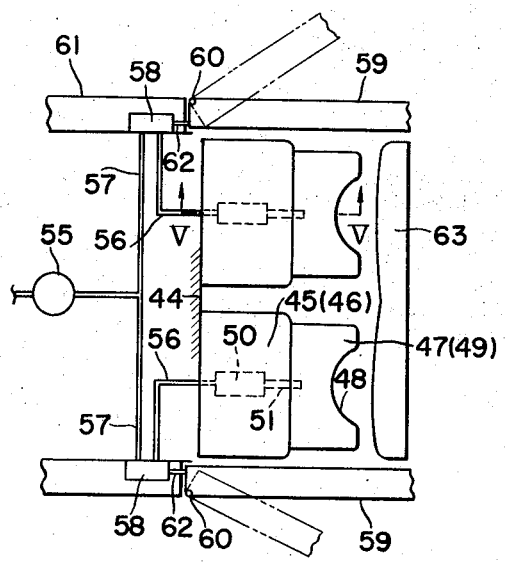
FIG. 4 is a diagrammatic plan view showing still another embodiment of the invention.
Figure 5:
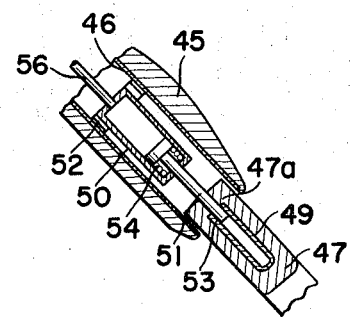
FIG. 5 is an enlarged, fragmentary section taken along the plane indicated by line V-V in FIG. 4 as viewed in the arrow direction.

In still another example of this invention as illustrated in FIG. 4, the safety device of this invention is adapted for use in a vehicle such as a taxi cab. When the vehicle is running, the holding boards of the passenger seat are always used. As a whole, the safety device is similar in organization to that of the first described example except that the transverse shaft and related parts are omitted.

Each holding board at its root part is similarly fixed to a base frame 44 and comprises, essentially, a fixed frame structure 46 having a tubular shape of rectangular cross section and covered around its outer surface with a shock-absorbing material 45 and a movable frame structure 49 having a tubular shape of rectangular cross section with a concave surface 48 at its outer or rear end and covered around its outer surface with a shock-absorbing material 47, the movable frame structure 49 being partly accommodated in and supported by the fixed frame structure 46 in a telescopic manner permitting only sliding movement of the former relative to the latter. The outer or rear end of each frame structure 46 is directed toward the pelvic region of a passenger (not shown) seated on a sent with a seat back 63.

To the base parts of these frame structures 46 and 49, there are respectively secured the outer ends of an air cylinder 50 and a piston rod 51 of an air cylinder device as at 52 and 53. The piston rod 51 is fixed to an air piston slidable disposed within the cylinder 50. A compression spring 54 for retracting the piston rod is disposed in the cylinder 50.

The working chamber of the air cylinder 50 of each holding board is communicatively connected by a pipe 56 to an outlet of a switching valve 58 disposed within and fixed to the side wall 61 of the vehicle on which a vehicle door 59 is hinged as at 60. The inlet of the switching valve 58 is connected by a pipe 57 to a pressure accumulator 55 supplied with compressed air from an air compressor (not shown) driven by the vehicle engine (also not shown).

Each switching valve 58 has an operating rod 62 adapted to be pushed by the door 59 on its respective side, whereby the switching valve is operated by the opening and closing of that door. When the door 59 is closed as indicated by full line in FIG. 4, the end face of the door forces the operating rod 62 of the switching valve 58 into the valve body to cause the pipes 56 and 57 to be communicative. When the door 59 is opened as indicated by chain line in FIG. 4, the operating rod 62 is pushed outward by a return spring (not shown) to operate the switching valve 58, which thereby shuts off the pipe 57 and simultaneously releases the interior of the pipe 56 to the atmosphere.

In one example of the switching valve device 58, there are provided a valve for opening and shutting off the pipes 56 and 57 and another valve for shutting off and opening communication between the pipe 56 and the outside atmosphere, these two valves being installed parallelly above and below.

The safety device of the above described organization operates as follows. After a passenger has boarded the vehicle and taken his seat, the door 59 nearest that seat is closed, whereupon the switching valve 58 is actuated to communicate the pipes 56 and 57, whereby the air cylinder device 50, 51 operates to elongate the holding board until the concave surface 48 contacts the front of the passenger's pelvic region.

When the door 59 is opened to permit the passenger to alight, the switching valve 58 is actuated to release the path of the pipe 56 to the atmosphere, whereupon the air cylinder device 50, 51 contracts under the force of the spring 54, and the holding board thereby contracts to permit the passenger to move out from his seat.

In the event of a collision occurring while the vehicle is running, the inertia of the passenger's body pressing against the movable frame structure 49 causes the air within the air cylinder 50 to be compressed, and, at the same time, the inner or root part 47a of the shock-absorbing material 47 strikes against the air cylinder 50 and functions to cushion the impact. In the case where it is necessary to reduce or suppress the reverse flow of the air within the cylinder 50 to the pressure accumulator 55, an orifice or a check valve may be installed in the pipe line 57.

While this invention has been described above with respect to examples wherein the holding boards are extensible and contractable in a telescopic manner, the invention by no means is thus limited, various other forms of the holding board (body-holding buffer structure) being employable.

Figure 8:
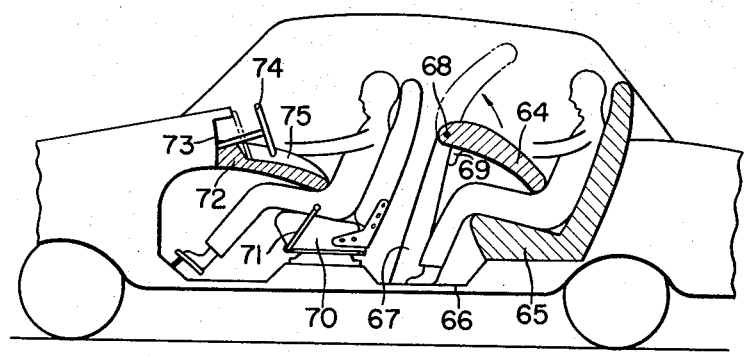
FIG. 8 is a side elevation, in vertical section, showing a further example of practice of the invention.

For example, a safety device of the character illustrated in FIG. 8 can be used. The holding board 64 in this example cannot extend or contract but has an external shape substantially the same as that of the aforedescribed holding board 1, shown in FIGS. 1, 2, and 3, in extended state and comprises a frame structure covered with a shock-absorbing material.

Similarly as in the preceding examples, this holding board 64 has a rear end with a concave surface for contacting the front part of the seated passenger's pelvic region and is inclined downward toward the rear. The proximal or front end of this holding board 64 is hinged as at 68 on the upper ends of support columns 67 fixedly mounted at their lower ends on the vehicle floor 66 on the two lateral sides thereof forward of the passenge seat 65 for which the holding board 64 is designed.

When a passenger is to board or alight from the vehicle, the holding board 64 may be swung upward as indicated by chain line in FIG. 8. In this safety device, means such as stop members 69 fixed to respective support columns 67 to establish the lower limit of rotation of the holding board 64 are provided so as to prevent the holding board 64 from swinging downward to an excess angle because of the inertia of the passenger in the event of a collision. Furthermore, a locking device (not shown), which can be easily and conveniently locked or unlocked, is provided to lock the holding board 64 thereby to prevent it from swing up at the time of a collision.

For a driver's seat 70, for example, that in an automobile wherein the forward-rear position of the seat 70 can be adjusted by means of a lever 71, the front or root end of a holding board 72 similar to the holding board 64 can be fixedly mounted to the vehicle body frame below the instrument panel or dashboard 73. In this case, a steering wheel 74 is disposed in front of the driver's upper body and in most cases is affixed to a steering column of a type which can contract or telescope at the time of a collision. To permit this contraction of the steering column and to permit the steering wheel to be manipulated for normal driving an amply large recess 75 is formed in the upper part of the holding board 72.

At the time of boarding or alighting of the driver, the driver's seat 70 is moved rearward and forward. Depending on the kind of vehicle and other factors, of course, a telescopic type holding board can be used for the driver's seat.

I claim:

1. A safety device for a vehicle, said device comprising:

a base frame mounted on a part of the vehicle and in front of a passenger's seat;

a body-holding buffer board made up of a shell structure and a shock-absorbing padding covering said shell, said buffer board having a rear concave surface and an upper surface;

telescoping means located within the interiors of said base frame and said buffer board and connecting said base frame and said buffer board in a manner to allow movement of said buffer board relative to said base frame in substantially front-to-rear direction of said vehicle and with an orientation such that said upper surface of said buffer board extends rearward and obliquely downward toward the pelvic region of a passenger in said seat facing the forward travelling direction of said vehicle and that said rear concave surface of said buffer board is disposed below the center of gravity of said seated passenger;

a hydraulic cylinder rigidly mounted within the interior of said base frame and extending in a direction parallel to said telescoping means;

a piston slidable within said cylinder and having a piston rod connected to said buffer board;

spring means disposed in said cylinder and resiliently retaining said piston at a neutral position within said cylinder and hence said buffer board at a predetermined position;

a first pipe means connected to said cylinder and supplying hydraulic fluid from a hydraulic fluid source to the interior of said cylinder;

a check valve in said first pipe means preventing flow of the hydraulic fluid from said cylinder to said source;

a second pipe means connected to said cylinder and discharging said hydraulic fluid from said interior of said cylinder;

a valve in said second pipe;

means for sensing deceleration of said vehicle; and switching means operating in response to a deceleration signal from said sensing means to cause said valve in said second pipe to operate to restrict the discharge flow of the hydraulic fluid through said second pipe means, thereby to lock the position of said piston and hence of said buffer board.

2. The safety device as claimed in claim 1, wherein said second pipe means includes orifice means connected downstream of said valve for throttling the hydraulic flow, and wherein said valve is positioned to communicatively connect said cylinder to said orifice means when said switching means is operated in response to said deceleration signal, whereby the hydraulic fluid in said cylinder is discharged gradually to enable the passenger's body to be gradually decelerated.

* * * * *